UNITED STATES PATENT OFFICE.

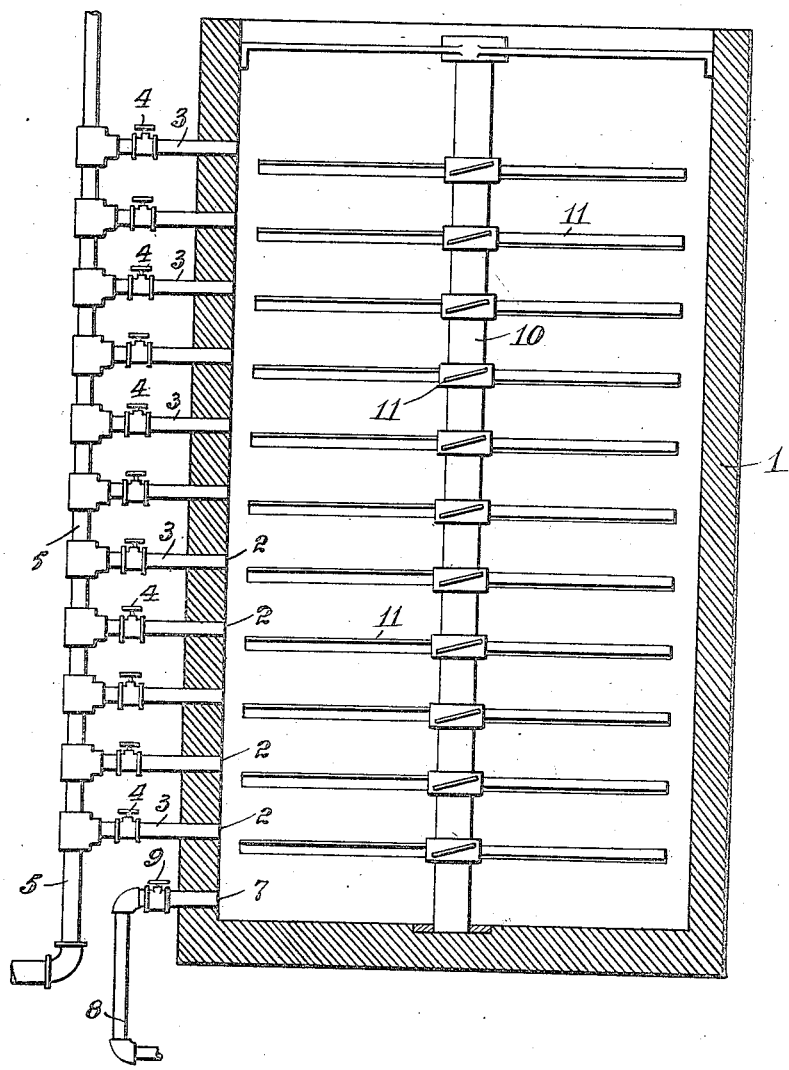

EDWARD R. HOLDEN, OF LOS ANGELES, CALIFORNIA.

HYDROMETALLURGY.

1,175,867.  Specification of Letters Patent.  Patented Mar. 14, 1916.

Application filed July 14, 1915. Serial No. 39,727.

*To all whom it may concern:*

Be it known that I, EDWARD R. HOLDEN, a citizen of the United States, and a resident of Los Angeles, in the county of Los Angeles and State of California, have invented certain new and useful Improvements in Hydrometallurgy, of which the following is a specification.

My invention relates to certain new and useful improvements in the art of hydrometallurgy and more particularly to improvements in which pulverized ore is subjected to the action of solvents for the dissolution of the precious or semi-precious metals contained in the ore, such solvents including sulfuric acid, potassium cyanid, chlorin or any other substance or solution in which the metals or compounds are capable of being dissolved.

My invention has for its object several new and economic operations, as hereinafter described; the first being to provide a process, whereby all classifying concentration or separating of the crushed ores and minerals, before being introduced into agitating tanks, for the action of any solvent solution thereon, is avoided and the whole mass of finely crushed ore, without any preliminary separation, classification or treatment, is at once deposited in any tank to be subjected to the action of any solvent.

In the accompanying drawing, I have illustrated diagrammatically one form of device for carrying out the process herein described.

A tank 1 of about eight to ten feet in diameter and about twelve feet high is provided in one side with eleven equidistant apertures 2, each connected with a pipe 3 having a cock 4, and they all lead to a common outlet pipe 5. At the bottom of the tank, I provide a separate outlet aperture 7 connected with the tube 8, having a cock 9 for withdrawing the concentrates. In the tank, a vertical shaft 10 is mounted on which are fixed paddles 11 for giving rotary motions to the ore and solution. The shaft is rotated by any suitable machinery.

In all present known agitating methods, in use in metallurgical works,—whether the agitation is produced by air, paddles or pumps,—it is the invariable practice when the charge in the tanks is completed, to cause the entire mass of ore and solution to be drawn from the tank simultaneously, and allowed to settle in settling tanks, or sent direct to filter presses and the solution separated from the ore and the dissolved metals in the solution are then precipitated by any of the well known methods. The product, from which the dissolved metals were obtained, are then known as tailings, and are discarded *en masse* into the waste dumps. These tailings always carry an appreciable value in gold and silver, that by my process will be reduced to mere traces of those metals, as will hereinafter be fully described.

By my invention I not only cause agitation of the ore particles in the solution, but I cause the mass of ore and solution to attain such regulated circumferential speed and to revolve in a tank about 12′ high, containing about 12 different outlets or openings and at controlled velocities, by the use of any mechanical device, consisting of paddles or blades, to impart a revolving motion to the mass and through these controlled velocities, keep the ore in suspension in different strata, composed of ore of different sizes and different specific gravities, and when the mass has been subjected to the action of the solvent for sufficient time to dissolve all the metals and compounds of metals that are amenable to the solvent, and the particles through controlled speed or velocities are in equilibrium in said tank, I then proceed to draw off only the uppermost stratum by the removal of a plug or the opening of a valve, situated at the bottom of the uppermost stratum, and allow the uppermost stratum consisting of ore and solution to escape, while the total remaining body of ore and solution in the tank, is still in regulated revolution. As soon as the upper or higher stratum is removed, I cause the next lowest or second plug or valve in the side of the tank to be opened, and allow the second stratum consisting of ore and solution to escape, while the total remaining body of ore and solution in the tank is still in regulated revolution. I then continue, in the same manner, to remove each remaining stratum of ore and solution downwardly and consecutively, all of which are allowed to flow into a settling tank, or are sent direct to filter presses, from the multiple of openings or plug holes, located about one foot apart more or less, and one below the other, in the side of the tank, until the last stratum, which is about one foot deep, and still remains in the tank is reached. This stratum is then removed by pulling its plug or opening its valve, and said stratum is allowed to escape into a separate settling tank for the undissolved metallic and concentrated mineral product exclusively. Through the controlled velocities, created and maintained during the entire operation, I have succeeded in causing the heavier particles, such as gold, silver and copper and their compounds, and the compounds of other metals, that were not dissolved, to be gathered in this last stratum and recovered, to be again recrushed and treated by other or stronger solvent solutions, or subjected to treatment by other methods to obtain the metals that were not dissolved by the solvent during the first treatment.

When the apparatus has been in operation for a sufficiently long period, all the chemically combined gold and silver as well as the finer particles of metallic gold and silver in the stratum above the lowest,—in the present case the eleven upper strata,—will have been found to be practically dissolved, and the tailings as they are removed stratum by stratum, consecutively, show by assay that the gold and silver in all these tailings of the upper strata are uniformly without value; but as stated, the lowest stratum containing the partially or undissolved gold and silver and other metals and mineralized compounds will be found very valuable.

The motion or speed of velocity of the revolving body of solution and ore, must not be altered in the least at any time while discharging each stratum through its opening. When the operation of the process is finished, and the solution and ore is to be discharged, it will not do to remove the upper eleven strata simultaneously, as that would disturb the equilibrium of every stratum at one and the same time, and would cause such a commotion as would also destroy the equilibrium of the lower stratum, and, therefore, cause a mixture of the lower stratum with some of the strata that were being discharged, and interfere with the segregated or concentrated gold, silver and mineral compounds in the bottom stratum of the tank. For the successful operation, it is necessary to draw off each stratum beginning at the top, before the next one below it is disturbed. By this new process of drawing off, at intervals, ore and solution, while it is in revolution, beginning at the top stratum in any tank and proceeding downward, I am enabled to remove all of the slimes and finer particles of ore from which the gold, silver and other metals have been fully dissolved, and retain in the lowermost stratum for further treatment, all metals or mineralized ores that were not fully dissolved, as is more particularly described hereafter.

The technique of this invention is lodged in the fact that I have discovered a new method for utilizing the well known law, that particles of finely crushed gangue or mineralized matter, being of different sizes and having different specific gravities, will in a gyrating body of water, under regulated velocity, rise to such heights as their gravities and sizes bear to each other.

For the benefit of those not versed in the art and to enable them to take advantage of this process, it will be found that in placing a body of finely crushed ore, as it comes from the crushing machinery, directly into a circular tank of any workable size, filled with solution, with dimensions say 6' to 10' diameter, and about 12' high, containing any of the well known devices for causing circumferential movement or velocity, that under controlled speed, all of the silicious gangue and mineralized matter having the smallest volumes and the lightest specific gravities will be found circulating in a stratum in the topmost part of the revolving body of solution. Immediately below this stratum will be found additional silicious gangue and mineralized matter having the next smallest volume and the next lightest specific gravity, circulating in the second stratum from the top and maintained therein through the constant controlled velocity. As we proceed to examine the contents of the moving body of ore and solution in the tank, we find that each succeeding stratum downward contains particles of ore of larger volume and greater specific gravity than those in the stratum just above. When the speed of the moving body of ore and liquid is fully regulated, it will be found that the various mineral compounds and metals have separated themselves out according to their volume and specific gravity.

In the operation of this process I use a tank with an inside height of 12'. This tank is filled with crushed ore and water containing any solvent used for the dissolution of metals or their compounds, in the proportion of one part of ore to two parts, more or less, of water containing the solvent. In practice I then impart only such velocity to the moving body of ore and solution as will cause all particles of gangue of about 300 mesh and finer to the inch, and known as slime, to ascend and remain in the uppermost part of the moving solution where it forms a stratum and remains indefinitely in that part of the tank, if the rotary momentum of the moving body of solution is kept constant. It now follows that any of the metals or compounds of metals contained in the tank, and being of the size of greater than 300 mesh to the inch, will be found between the top stratum and bottom of the tank, circulating in the moving body of solution at different points, according to their specific gravities. In practice, using a tank 12′ deep, the velocity is regulated and controlled so as to produce as large a number of strata as the composition of the ore will furnish, each having a depth of approximately one foot. It must be understood that the regulated controlled velocity that will cause a particle of silica of 300 mesh to the inch, to be in equilibrium in the top stratum, will allow a particle of metallic gold of the same size, to be in equilibrium at a distance twelve times lower in the moving body of ore and solution, as the specific gravity of the particle of gold of the same size is twelve times greater than the particle of silica. It will now be apparent that if the tank is filled with one third ore and two thirds water, and the circumferential velocity is regulated so that only silica or gangue of 300 mesh and finer is raised to the upper strata of a tank, which is 12′ deep, that the particle of metallic gold will remain at equilibrium in the moving body at the bottom of the tank. It then follows that a particle of metallic silver, of the size of 300 mesh to the inch, will be in equilibrium at a point six times lower than the particle of silica, the specific gravity of silver being six times greater than the specific gravity of silica. It next follows that a particle of metallic copper, of the size of 300 mesh to the inch, will be at equilibrium at a point five times lower than the particle of silica. It next follows that the compounds of the three metals described, and the compounds of other metals, all having different specific gravities, greater than that of the silica or gangue, will be in circuitous circulation at points at different distances below the upper stratum and will with any metallic substances in the tank, occupy succeeding strata grading from below the topmost or upper stratum down to the bottom of the tank. It must be understood that the above citation of 300 mesh to the inch material, is only given to illustrate the action of a regulated velocity on a circuitous moving body of ore and solution, and the separation into definite strata of all the particles of matter, according to their size and specific gravities.

All the particles of metals and mineralized matter, from 150 mesh to the inch and finer, in any of the present agitating methods, are readily attacked and dissolved by the solvent used, whereas only to a limited degree are the particles of metal and mineralized matter crushed coarser than 150 mesh to the inch, attacked and dissolved. This latter product of all mills constitutes and is the principal cause for the loss of gold, silver and other metals in the tailings.

By the proceedings, carried out in my process, all of the undissolved metals and compounds of metals, or mineralized matter, instead of being removed *en masse* and discarded as tailings in the general mass of the ore, are retained and concentrated and recovered in the lowest stratum of the tank, this operation occurring simultaneously with the dissolving of such metals and compounds of metals as are amenable to the solvent, thereby constituting a new process of concentrating while dissolving precious and other metals and compounds of metals, in the same tank in the same operation.

The present known practice in all mills, where ore in the presence of a solvent is kept in suspension, is to stir up and agitate the ore until the contents of gold, silver or other metals of compounds of metals, that are amenable, are dissolved as far as possible by the solvent used, and then the total contents of the agitating tank are allowed to settle and the solution drawn off, or the total mass discharged as an entirety into settling tanks, to allow the product which is then known as tailings, to settle and the solution containing the dissolved metals, drawn, or filtered off and precipitated, when the entire mass of tailings is then thrown into the waste dump.

By the operation of my process, the ore in the presence of a solvent, is kept circularly moving in the tank until the contents of gold, silver or other metals or compounds of metals, that are amenable, are dissolved by the solvent used, and then only the dissolved portions of ore and solution are drawn off beginning at the top of the tank, stratum by stratum downward and deposited in a settling tank and the solution containing the dissolved metals precipitated, as in regular practice, while all the coarser particles of metals and mineralized matter, that were not amenable or dissoluble, in the solvent, have been accumulated in the bottom of the tank, and recovered for further or other treatment as described.

I have found in experimenting, that tanks of the height of twelve feet, of a diameter of 6′ to 10′ with draw-off openings in the sides thereof, located about one foot apart from the top to the bottom of the tank, allows sufficient depth for each strata to carry out this process, but tanks of any size can be used, with openings of sufficient number in the side of such tanks, without departing from the intent and spirit of my process.

In practice of this process, on ores that are excessively mineralized and the metallic contents not fully amenable to the various solvent solutions, it may be found necessary to retain, not only the bottom stratum in the tank, but one or more strata just above, so as to recover the entire amount of metallic substances and mineralized metallic compounds in such ores, which resisted the action of the solvents, for further treatment, and this is a part of the operation of my process and can be carried out without departing from the intent or spirit of my invention.

By the operations described, I am enabled to keep the ore and mineralized compounds confined in a tank, until the solvent used has dissolved all of the precious and other metals, contained in the finely crushed material, and then remove the ore and solution stratum by stratum, without disturbing or removing from the bottom stratum in the tank, any of the concentrated and mineralized compounds, from which the precious and other metals were only partially, or not at all dissolved, thereby constituting an advantage over the present practice of removing the entire mass of ore and solution and after separating the solution, consigning the total tailings to the waste dump.

In operating this process, the best results are obtained by regulating the speed and velocity of the moving body of ore and solution, so that the largest particles of gangue or silica in the mass are raised into and maintained in equilibrium in the next to the lowest stratum in the tank. The above regulated speed and velocity is not sufficient to cause any of the particles of metals or their compounds, which on account of their volume, could not be wholly dissolved in the solution, to be raised from the lowest stratum; but such speed and velocity is sufficient to cause all the smaller particles of metals and their compounds, to rise in the solution, and on account of their smaller volume, the gold and silver contents thereof, being amenable to the solution are wholly dissolved.

The reason the ore and solution is withdrawn from the tank, stratum by stratum, one after the other successively, commencing with the topmost, is for the purpose of avoiding any material disturbance in the equilibrium of the ore and solution in any of the various strata below the one that is being withdrawn. It is impractical to withdraw the different strata simultaneously, or to withdraw any of the strata through any of the openings, other than successively downward from the topmost, as either method of procedure would create a violent and disturbing commotion and destroy the equilibrium of all the strata, including the lowest stratum containing the concentrates, which concentrates would then rise and mix with the general mass of gangue and silicious matter and be lost as tailings through some of the various openings. The only successful method of carrying out this process is to withdraw the ore and solution, stratum by stratum successively, from the top downward, and this constitutes one of the essential features of this invention.

I am aware of the fact that there are many devices for which patents have been issued for the simple concentration of ores, whereby a rotary or other motion is used to cause the lighter particles of ore to rise in a revolving or moving body of water, and the light particles allowed to continuously overflow out of one or more spouts, allowing the heavier particles to concentrate on the bottom to be thereafter removed, but I am not aware of any process, having ever been used or patented, whereby, the different sizes of ore, having different specific gravities, are separated into different strata and confined in a tank and rotated *en masse* and kept in that stratified position in a solvent solution, until all the gold, silver and metallic contents, amenable to the solvent are dissolved, and the gangue from which the metallic contents were extracted, removed from the tank, stratum after stratum downward from the top, and at the same time retaining the undissolved and heavier particles of gold, silver and other metals and compounds of these metals in the bottom of the tank, thereby performing the action of dissolution of the metals and their compounds and simultaneous concentration of all the metals and their compounds not amenable to the solvent solution, at one and the same time, in the same apparatus. I am also aware of the fact that there are many devices for which patents have been granted for agitating ore in tanks containing a solvent solution, the object being, in all cases, to keep the ore in suspension, surrounded by the dissolving solution, until all of the gold, silver or other metals or compounds of metals that are amenable to the solvents are dissolved, when the entire mass in bulk is then removed from the tank, either by first allowing the ore to settle in the said tank and decanting and washing out the clear solvent liquor containing the dissolved metals, or second, by passing the entire contents of the tank through filter presses to separate the liquor from the remaining ore, in both instances however, consigning the entire ore *en masse* to the waste dump as tailings. I am not, however, aware of any process or device having ever been used or patented, whereby, in the treatment of ores, the various particles of gold, silver or other metals, or the compounds of such metals amenable to the solvents have been dissolved, while in the same operation, the gold, silver and other metals or the compounds of metals, not amenable to the solvents used, have been retained or concentrated and recovered simultaneously in the said tank, and only the gangue from which the metals were dissolved allowed to escape, stratum by stratum, consecutively through the separate openings, while the body of ore and solution is kept in a circumgyratory or any other action and the metal or mineral compounds from which the metals were not dissolved, retained in the lower stratum and not mixed in the general mass of tailings discarded.

The apparatus herein shown and described but not claimed, forms the subject matter of another application, Serial No. 41045, series of 1915, filed July 21st, 1915.

Having described my invention what I claim as new and desire to secure by Letters Patent is:

1. The herein described improvement in hydrometallurgy, which consists in mixing pulverized ore with a dissolving solution, and giving the mixture of solution and pulverized ore a rotary motion in a tank, whereby the particles of ore are elevated to different strata in the solution, according to their size and specific gravity and when the solution has dissolved the metallic contents, withdrawing the gangue and solution from the tank, stratum by stratum in successive steps downward from the top.

2. The herein described method of dissolving and concentrating the valuable constituents of an ore, at one and the same time, which consists in mixing pulverized ore with a liquid solvent, rotating the mixture of the ore and solvent in a tank so that the particles of ore are elevated by the action of the rotary motion of the liquid, and form various strata in conformity with their specific gravities and sizes, while the larger particles of metals and their compounds, not wholly dissolved in the solution, remain in the bottom of the tank, then withdrawing the solution containing the dissolved metals and the gangue from the tank, in successive steps downward from the top, while maintaining and continuing the rotary motion of the solution and its contents, leaving the non-dissolved metals and their compounds in the lowermost stratum of the tank, and subsequently recovering and removing such separated remaining non-dissolved metals and their compounds.

Signed at New York city, borough of Manhattan in the county of New York and State of New York this 13th day of July A. D. 1915.

EDWARD R. HOLDEN.

Witnesses:
 THEO. R. J. HUNTER,
 N. H. LEE.